United States Patent
Yamazaki et al.

(10) Patent No.: US 10,195,597 B2
(45) Date of Patent: Feb. 5, 2019

(54) MANUFACTURING METHOD OF HONEYCOMB STRUCTURE

(71) Applicant: NGK INSULATORS, LTD., Nagoya (JP)

(72) Inventors: Satoshi Yamazaki, Nagoya (JP); Toru Hayase, Nagoya (JP); Kenji Morimoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 35 days.

(21) Appl. No.: 15/467,117

(22) Filed: Mar. 23, 2017

(65) Prior Publication Data
US 2017/0282168 A1 Oct. 5, 2017

(30) Foreign Application Priority Data
Mar. 31, 2016 (JP) .................. 2016-072588

(51) Int. Cl.
*B01D 53/04* (2006.01)
*B01J 21/04* (2006.01)
(Continued)

(52) U.S. Cl.
CPC .............. *B01J 29/85* (2013.01); *B01D 53/02* (2013.01); *B01D 53/0407* (2013.01); *B01D 53/9413* (2013.01); *B01J 21/04* (2013.01); *B01J 21/12* (2013.01); *B01J 29/084* (2013.01); *B01J 29/146* (2013.01); *B01J 29/40* (2013.01); *B01J 29/46* (2013.01); *B01J 29/7007* (2013.01); *B01J 29/7015* (2013.01); *B01J 29/723* (2013.01); *B01J 29/7215* (2013.01); *B01J 29/763* (2013.01); *B01J 29/7615* (2013.01);
(Continued)

(58) Field of Classification Search
None
See application file for complete search history.

(56) References Cited

U.S. PATENT DOCUMENTS 8,871,667 B2 10/2014 Kikuchi et al.
2011/0236271 A1 9/2011 Kikuchi et al.
(Continued)

FOREIGN PATENT DOCUMENTS

EP 2 368 631 A1 9/2011
EP 2 845 646 A2 3/2015
(Continued)

OTHER PUBLICATIONS

Extended European Search Report (Application No. 17163127.8) dated Aug. 22, 2017.

*Primary Examiner* — Colin W. Slifka
(74) *Attorney, Agent, or Firm* — Burr & Brown, PLLC

(57) ABSTRACT

The manufacturing method includes a step of mixing a coarse particle zeolite, a fine particle zeolite, and a raw material of an inorganic bonding material to prepare a zeolite raw material; a step of forming the prepared zeolite raw material into a honeycomb shape to prepare a honeycomb formed body; and a step of firing the prepared honeycomb formed body to prepare the honeycomb structure. In the step of preparing the zeolite raw material, as the coarse particle zeolite, a chabazite type zeolite having a specific average particle diameter, the fine particle zeolite having a specific average particle diameter, the raw material of the inorganic bonding material which includes at least basic aluminum lactate is used.

13 Claims, 5 Drawing Sheets

(51) Int. Cl.
*B01J 21/12* (2006.01)
*B01J 29/72* (2006.01)
*B01J 29/80* (2006.01)
*B01J 29/85* (2006.01)
*B01J 35/00* (2006.01)
*B01J 35/04* (2006.01)
*B01J 37/00* (2006.01)
*B01J 37/04* (2006.01)
*B01J 37/08* (2006.01)
*B01J 37/30* (2006.01)
*B28B 11/24* (2006.01)
*B28B 3/20* (2006.01)
*B01J 29/08* (2006.01)
*B01J 29/14* (2006.01)
*B01J 29/40* (2006.01)
*B01J 29/46* (2006.01)
*B01J 29/70* (2006.01)
*B01J 29/76* (2006.01)
*B01J 35/02* (2006.01)
*B01J 35/10* (2006.01)
*B01D 53/02* (2006.01)
*B01D 53/94* (2006.01)

(52) U.S. Cl.
CPC .......... *B01J 29/80* (2013.01); *B01J 35/0006* (2013.01); *B01J 35/023* (2013.01); *B01J 35/04* (2013.01); *B01J 35/1033* (2013.01); *B01J 35/1052* (2013.01); *B01J 35/1095* (2013.01); *B01J 37/0018* (2013.01); *B01J 37/04* (2013.01); *B01J 37/082* (2013.01); *B01J 37/30* (2013.01); *B28B 3/20* (2013.01); *B28B 11/243* (2013.01); *B01D 2253/108* (2013.01); *B01D 2253/311* (2013.01); *B01D 2253/3425* (2013.01); *B01D 2255/502* (2013.01); *B01D 2255/504* (2013.01); *B01D 2255/91* (2013.01); *B01D 2255/912* (2013.01); *B01D 2257/404* (2013.01); *B01D 2257/702* (2013.01); *B01J 2229/183* (2013.01); *B01J 2229/186* (2013.01); *B01J 2229/42* (2013.01); *B28B 2003/203* (2013.01)

(56) References Cited

U.S. PATENT DOCUMENTS

| | | |
|---|---|---|
| 2011/0237423 A1 | 9/2011 | Kikuchi et al. |
| 2012/0034446 A1* | 2/2012 | Tohma ............... B01D 39/2079 428/304.4 |
| 2013/0316129 A1* | 11/2013 | Yabuki ................ C04B 35/19 428/116 |
| 2015/0065336 A1 | 3/2015 | Sato et al. |
| 2015/0273446 A1 | 10/2015 | Kunieda et al. |
| 2016/0001277 A1 | 1/2016 | Usui et al. |

FOREIGN PATENT DOCUMENTS

| | | |
|---|---|---|
| EP | 2 905 075 A1 | 8/2015 |
| JP | 60-131857 A1 | 7/1985 |
| JP | 5560158 B2 | 7/2014 |
| JP | 5580090 B2 | 8/2014 |
| JP | 5732170 B1 | 6/2015 |
| JP | 2015-193489 A1 | 11/2015 |
| JP | 5837408 B2 | 12/2015 |

* cited by examiner

MANUFACTURING METHOD OF HONEYCOMB STRUCTURE

The present application is an application based on JP-2016-072588 filed on Mar. 31, 2016 with Japan Patent Office, the entire contents of which are incorporated herein by reference.

BACKGROUND OF THE INVENTION

Field of the Invention

The present invention relates to a manufacturing method of a honeycomb structure, and more particularly, it relates to a manufacturing method to manufacture a honeycomb structure which has an excellent $NO_x$ purification performance and also an excellent mechanical strength.

Description of the Related Art

A zeolite is a type of silicate salt having a mesh-like crystal structure in which fine pores having a uniform diameter are formed. Furthermore, it is known that as zeolites, various chemical compositions are present and that a large number of types of crystal structures having different pore shapes are present. These zeolites have an inherent adsorption ability, a catalytic performance, solid acid characteristics, an ion exchange ability, and the like based on the respective chemical compositions and crystal structures, and are utilized in various use applications such as an adsorbing material, a catalyst, a catalyst carrier, a gas separation membrane, and an ion exchanger.

For example, the zeolite is utilized in a use such as an adsorption material to adsorb nitrogen oxides ($NO_x$), hydrocarbons (HC) and the like in a car exhaust gas, or the gas separation membrane to selectively separate only p-xylene from a xylene isomer. Heretofore, as a purifying member to purify the car exhaust gas, a catalyst body onto which an ion-exchanged zeolite is loaded has been used in a honeycomb structure of a honeycomb shape made of cordierite or the like.

In a case where the zeolite is loaded onto the above honeycomb structure made of cordierite or the like, cordierite or the like does not exhibit an operation of the $NO_x$ purification, the adsorption of hydrocarbons, or the like, and hence a pressure loss when an exhaust gas passes might increase as much as the presence of cordierite or the like.

To solve this problem, there has been suggested a method of forming and firing a forming raw material containing an ion-exchanged zeolite with metal ions to form a honeycomb structure itself (e.g., see Patent Documents 1 to 4).

[Patent Document 1] JP 5560158
[Patent Document 2] JP 5837408
[Patent Document 3] JP 5580090
[Patent Document 4] JP 5732170

SUMMARY OF THE INVENTION

In Patent Documents 1 and 2, a honeycomb structure made of a zeolite raw material containing a phosphate-based zeolite is disclosed. The phosphate-based zeolite is excellent in a $NO_x$ purification performance and can improve the $NO_x$ purification performance of the honeycomb structure made of the zeolite raw material. Here, in the phosphate-based zeolite, a lattice constant changes due to an adsorption or a desorption of water, and hence a contraction or an expansion of the honeycomb structure easily occurs. Consequently, the honeycomb structure in which the phosphate-based zeolite is only used is remarkably easy to be damaged. To solve such a problem, in Patent Documents 1 and 2, there is described a technology of preparing the honeycomb structure from the zeolite raw material to which a β-type zeolite or a ZSM-5 type zeolite is added in addition to the phosphate-based zeolite. For example, in Patent Document 1, it is described that the honeycomb structure is prepared by using such a zeolite raw material as described above, and hence the damages on the honeycomb structure which are generated by the adsorption or the desorption of the water can effectively be inhibited.

Although the honeycomb structures described in Patent Documents 1 and 2 enable the damages caused by the adsorption or the desorption of the water to be inhibited, it has been necessary to increase an amount of an inorganic bonding material for the purpose of sufficiently acquiring a strength of the honeycomb structure. For example, in the honeycomb structures described in Patent Documents 1 and 2, when about 20 mass % of the inorganic bonding material is not added to the zeolite raw material, it is difficult to obtain the honeycomb structure having such a strength resistant to actual use. In this way, in the honeycomb structures described in Patent Documents 1 and 2, the amount of the inorganic bonding material is increased, thereby making it possible to improve the mechanical strength to a certain degree. However, when the large amount of the inorganic bonding material is contained, a ratio of the zeolite to be included in the honeycomb structure decreases, and hence there has been the problem that the purification performance deteriorates.

Furthermore, in Patent Document 3, for the purpose of preventing the deterioration of the purification performance caused by the large amount of the contained inorganic bonding material, there has been suggested a zeolite structure made of a zeolite raw material including fine zeolite particles and coarse zeolite particles. However, in the zeolite structure described in Patent Document 3, it is comparatively difficult to use a chabazite type zeolite which has a more excellent purification performance. Consequently, there is a strongly required development of a honeycomb structure made of a zeolite material which has an excellent $NO_x$ purification performance and which enables a decrease of strength of the honeycomb structure to be efficiently inhibited, by a method different from the technology described in Patent Document 3.

Furthermore, in Patent Document 4, a honeycomb catalyst in which a zeolite having a chabazite structure is used is disclosed. Such a honeycomb catalyst has the problem that when an amount of zeolite increases to maintain a high purification performance, the strength decreases.

The present invention has been developed in view of the above-mentioned problem. According to the present invention, there is provided a manufacturing method to manufacture a honeycomb structure which has an excellent $NO_x$ purification performance and also an excellent mechanical strength. In particular, according to the present invention, there is provided a manufacturing method of the honeycomb structure in which agglomerating properties of the inorganic bonding material to bond zeolite particles to one another improve to achieve a high mechanical strength while maintaining a high $NO_x$ purification performance.

The present inventor has intensively studied to solve the problems of the conventional technology and has eventually obtained the following finding. First, the present inventor has studied agglomerating properties of an inorganic bonding material to bond zeolite particles to one another in a honeycomb structure made of a conventional zeolite material. Consequently, in the conventional honeycomb structure, it has become clear that the inorganic bonding material is dispersed in the zeolite material and that a part of the inorganic bonding material does not sufficiently contribute to the bonding of the zeolite particles to one another. That is, in a case where it is possible to improve the agglomerating properties of the inorganic bonding material to bond the zeolite particles to one another, it is possible to inhibit a decrease of a mechanical strength, especially a compressive strength of the honeycomb structure even when the amount of the inorganic bonding material decreases as compared with the conventional honeycomb structure. Furthermore, when the amount of the inorganic bonding material can decrease, a ratio of the zeolite to be included in the honeycomb structure relatively increases and the purification performance can improve.

The present inventor has performed various studies concerning a raw material used in the inorganic bonding material, and has obtained the finding that using basic aluminum lactate as the raw material of the inorganic bonding material enables the agglomerating properties of the inorganic bonding material in the obtained zeolite material to improve. Furthermore, the present inventor has found that using coarse particle and fine particle zeolites having specific average particle diameters and basic aluminum lactate as the inorganic bonding material raw material enables the mechanical strength of the obtained honeycomb structure to improve, and the present inventor has completed the present invention. Specifically, according to the present invention, there is provided the following manufacturing method of the honeycomb structure.

According to a first aspect of the present invention, a manufacturing method of a honeycomb structure is provided including:

a step of mixing a coarse particle zeolite having a large average particle diameter, a fine particle zeolite having an average particle diameter smaller than that of the coarse particle zeolite, and a raw material of an inorganic bonding material to prepare a zeolite raw material;

a step of forming the prepared zeolite raw material into a honeycomb shape to prepare a honeycomb formed body; and a step of firing the prepared honeycomb formed body to prepare the honeycomb structure, wherein in the step of preparing the zeolite raw material, as the coarse particle zeolite, a chabazite type zeolite is used in which an average particle diameter is 2 μm or more and 6 μm or less, the fine particle zeolite is used in which an average particle diameter is 0.02 μm or more and smaller than 2 μm, the raw material of the inorganic bonding material which includes at least basic aluminum lactate is used, and 10 to 35 parts by mass of the basic aluminum lactate as the raw material of the inorganic bonding material is added to 100 parts by mass of a total mass of the coarse particle zeolite and the fine particle zeolite, to prepare the zeolite raw material.

According to a second aspect of the present invention, the manufacturing method of the honeycomb structure according to the above first aspect is provided, wherein in the raw material of the inorganic bonding material, a mass ratio of the basic aluminum lactate is from 65 to 100 mass %.

According to a third aspect of the present invention, the manufacturing method of the honeycomb structure according to the above first or second aspects is provided, wherein as the raw material of the inorganic bonding material, boehmite is further used in addition to the basic aluminum lactate.

According to a fourth aspect of the present invention, the manufacturing method of the honeycomb structure according to the above third aspect is provided, wherein in the raw material of the inorganic bonding material, a mass ratio of the basic aluminum lactate is from 65 to 90 mass % and a mass ratio of the boehmite is from 10 to 35 mass %.

According to a fifth aspect of the present invention, the manufacturing method of the honeycomb structure according to any one of the above first to fourth aspects is provided, wherein 10 to 50 parts by mass of the raw material of the inorganic bonding material is added to 100 parts by mass of the total mass of the coarse particle zeolite and the fine particle zeolite, to prepare the zeolite raw material.

According to a sixth aspect of the present invention, the manufacturing method of the honeycomb structure according to any one of the above first to fifth aspects is provided, wherein as the coarse particle zeolite, at least one selected from the group consisting of chabazite, SAPO-34 and SSZ-13 is used.

According to a seventh aspect of the present invention, the manufacturing method of the honeycomb structure according to any one of the above first to sixth aspects is provided, wherein as the fine particle zeolite, at least one selected from the group consisting of a β-type zeolite, a Y-type zeolite, a ZSM-5 type zeolite and the chabazite type zeolite is used.

According to an eighth aspect of the present invention, the manufacturing method of the honeycomb structure according to any one of the above first to seventh aspects is provided, wherein the basic aluminum lactate as the raw material of the inorganic bonding material is dissolved in water, and the basic aluminum lactate dissolved in water is mixed with the coarse particle zeolite and the fine particle zeolite, to prepare the zeolite raw material.

According to a ninth aspect of the present invention, the manufacturing method of the honeycomb structure according to the above eighth aspect is provided, wherein the basic aluminum lactate as the raw material of the inorganic bonding material is dissolved in an amount of water which corresponds to twice or more as much as the mass of the basic aluminum lactate.

According to a tenth aspect of the present invention, the manufacturing method of the honeycomb structure according to any one of the above first to ninth aspects is provided, further including a step of performing ion exchange of the coarse particle zeolite and the fine particle zeolite with copper ions.

According to an eleventh aspect of the present invention, the manufacturing method of the honeycomb structure according to the above tenth aspect is provided, wherein the step of performing the ion exchange is performed prior to the step of preparing the zeolite raw material.

According to a twelfth aspect of the present invention, the manufacturing method of the honeycomb structure according to any one of the above first to eleventh aspects is provided, wherein at least one selected from the group consisting of inorganic fibers such as an alumina fiber, a silica alumina fiber and a glass fiber is further added to prepare the zeolite raw material.

According to a thirteenth aspect of the present invention, the manufacturing method of the honeycomb structure according to the above twelfth aspect is provided, wherein 5 to 20 parts by mass of the inorganic fiber is added to 100 parts by mass of the total mass of the coarse particle zeolite and the fine particle zeolite, to prepare the zeolite raw material.

According to a manufacturing method of a honeycomb structure of the present invention, it is possible to simply manufacture the honeycomb structure which has an excellent $NO_x$ purification performance and also an excellent mechanical strength. Particularly, in the honeycomb structure manufactured by the manufacturing method of the honeycomb structure of the present invention, improving agglomerating properties of an inorganic bonding material to bond zeolite particles in a zeolite material to one another enables a high mechanical strength to be achieved while maintaining a high $NO_x$ purification performance.

DESCRIPTION OF THE PREFERRED EMBODIMENTS

Figure 1:
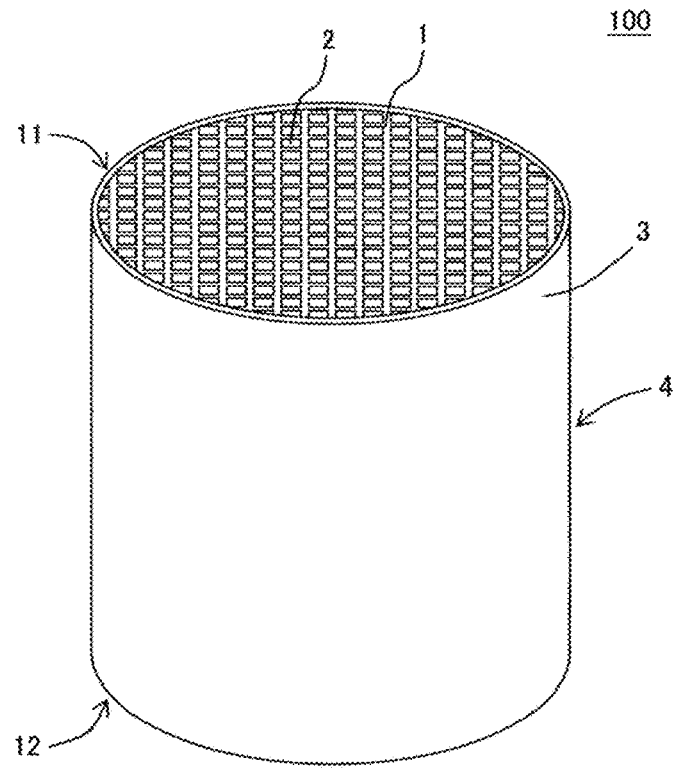
FIG. 1 is a perspective view schematically showing a honeycomb structure manufactured by a manufacturing method of the honeycomb structure of the present invention.

Hereinafter, an embodiment of the present invention will be described. However, the present invention is not limited to the following embodiment. Therefore, it should be understood that modifications, improvements and the like can suitably be added to the following embodiment on the basis of ordinary knowledge of a person skilled in the art without departing from the gist of the present invention.

(1) Manufacturing Method of Honeycomb Structure:

An embodiment of a manufacturing method of a honeycomb structure of the present invention includes a step of preparing a zeolite raw material, a step of forming the zeolite raw material to prepare a honeycomb formed body, and a step of firing the honeycomb formed body to prepare the honeycomb structure. Hereinafter, the step of preparing the zeolite raw material will be referred to as "a zeolite raw material preparing step" sometimes. The step of forming the zeolite raw material to prepare the honeycomb formed body will be referred to as "a forming step" sometimes. The step of firing the honeycomb formed body to prepare the honeycomb structure will be referred to as "a firing step" sometimes.

The manufacturing method of the honeycomb structure of the present embodiment has mainly characteristics in the zeolite raw material preparing step. The zeolite raw material preparing step is a step of mixing a coarse particle zeolite, a fine particle zeolite, and a raw material of an inorganic bonding material, to prepare the zeolite raw material. Further, in this zeolite raw material preparing step, zeolite particles having specific average particle diameters are used as the coarse particle zeolite and the fine particle zeolite, respectively. That is, as the coarse particle zeolite, a chabazite type zeolite having an average particle diameter of 2 μm or more and 6 μm or less is used. Furthermore, as the fine particle zeolite, a zeolite having an average particle diameter of 0.02 μm or more and smaller than 2 μm is used. It is to be noted that in the manufacturing method of the honeycomb structure of the present embodiment, the coarse particle zeolite is referred to as a zeolite whose particle diameters are relatively large as compared with the fine particle zeolite. Further, the fine particle zeolite is referred to as a zeolite whose average particle diameter is smaller than that of the coarse particle zeolite. Furthermore, in the zeolite raw material preparing step, it is especially important to use the raw material of the inorganic bonding material which includes at least basic aluminum lactate. Then, 10 to 35 parts by mass of basic aluminum lactate as the raw material of the inorganic bonding material is added to 100 parts by mass of a total mass of the coarse particle zeolite and the fine particle zeolite, to prepare the zeolite raw material.

In the manufacturing method of the honeycomb structure of the present embodiment, the zeolite raw material prepared as described above is formed into a honeycomb shape to prepare the honeycomb formed body, and then the prepared honeycomb formed body is fired to prepare the honeycomb structure. This manufacturing method of the honeycomb structure enables the honeycomb structure which has an excellent $NO_x$ purification performance and also an excellent mechanical strength to be simply manufactured. Especially, in the honeycomb structure manufactured by the manufacturing method of the honeycomb structure of the present embodiment, improving agglomerating properties of the inorganic bonding material to bond zeolite particles in a zeolite material to one another enables a high mechanical strength while maintaining a high $NO_x$ purification performance to be achieved.

As described above, in the coarse particle zeolite used in the zeolite raw material preparing step, the average particle diameter of primary particles is 2 μm or more and 6 μm or less. Furthermore, in the fine particle zeolite used in the zeolite raw material preparing step, an average particle diameter of primary particles is 0.02 μm or more and smaller than 2 μm. The coarse particle zeolite and fine particle zeolite used in the zeolite raw material preparing step are particulate, and will hereinafter be referred to suitably as "coarse zeolite particles" and "fine zeolite particles" sometimes. Further, the coarse zeolite particles and fine zeolite particles will generically be referred to simply as "the zeolite particles" sometimes.

The average particle diameters of the coarse particle zeolite and the fine particle zeolite are values measured in conformity with JIS R1629 by a laser diffraction scattering method. For example, the average particle diameter of the zeolite particles can be measured with "LA-920 (trade name)" which is a laser diffraction/scattering type particle size distribution measurement device manufactured by HORIBA, Ltd. Here, "the primary particles" are not secondary particles in which a plurality of particles having small particle diameters gather and harden into one unit by Van der Waals force among the particles, but the primary particles are independent particles, i.e., one crystal. Hereinafter, in a case where the average particle diameters of the coarse particle zeolite and the fine particle zeolite are described, the average particle diameters mean "the average particle diameter of the primary particles" unless otherwise specified.

It is to be noted that when the average particle diameter of the primary particles of the coarse particle zeolite is smaller than 2 μm or in excess of 6 μm or the average particle diameter of the primary particles of the fine particle zeolite is smaller than 0.02 μm or 2 μm or more, the mechanical strength of the honeycomb structure might decrease. Furthermore, when the average particle diameter of the coarse particle zeolite is smaller than 2 μm or in excess of 6 μm, it might be difficult to manufacture the honeycomb structure having the high $NO_x$ purification performance.

It is to be noted that in the present specification, the zeolite raw material means a forming raw material containing at least the zeolite particles, and the raw material of the inorganic bonding material, to manufacture the honeycomb structure. Furthermore, the zeolite material means a material which is comprised the honeycomb structure manufactured by drying and firing a formed body obtained by forming the zeolite raw material, i.e., a material which is comprised a sintered body. Furthermore, the raw material of the inorganic bonding material is a raw material which yields the inorganic bonding material to bond the plurality of zeolite particles in the zeolite material to one another in the manufactured honeycomb structure.

Here, the chabazite type zeolite is referred to as a zeolite having a three-dimensional pore structure which comprises an oxygen 8-membered ring of 3.8×3.8 angstroms.

In the zeolite raw material preparing step, an amount of basic aluminum lactate used as the raw material of the inorganic bonding material is from 10 to 35 parts by mass to 100 parts by mass of the total mass of the coarse particle zeolite and the fine particle zeolite. When the amount of basic aluminum lactate is from 10 to 35 parts by mass, the inorganic bonding material agglomerates around the fine zeolite particles, a neck portion of a bonding portion formed by the inorganic bonding material thickens, and a strength increases. On the other hand, when the amount of basic aluminum lactate is smaller than 10 parts by mass, the inorganic bonding material does not agglomerate around the fine zeolite particles and is dispersed in a comparatively broad range. Therefore, the neck portion of the bonding portion formed by the inorganic bonding material does not thicken and the strength of the honeycomb structure might decrease. On the other hand, when the amount of basic aluminum lactate is in excess of 35 parts by mass, a ratio of the zeolite particles in the zeolite material might decrease, and hence the $NO_x$ purification performance might deteriorate. It is to be noted that when the masses of the coarse particle zeolite and the fine particle zeolite are measured, the coarse particle zeolite and the fine particle zeolite used are beforehand dried at 200° C. in a drying chamber for 5 hours, and returned to room temperature in a drying atmosphere, and then the masses are immediately measured.

It is to be noted that the amount of basic aluminum lactate is preferably from 12 to 30 parts by mass and further preferably from 14 to 25 parts by mass to 100 parts by mass of the total mass of the coarse particle zeolite and the fine particle zeolite. Such ratio enables the honeycomb structure which has an excellent mechanical strength and also an excellent $NO_x$ purification performance to be suitably manufactured.

It is to be noted that a mass of the raw material of the inorganic bonding material is a mass of the raw material of the inorganic bonding material in terms of a solid content excluding a liquid component such as a liquid medium.

In the manufacturing method of the honeycomb structure of the present embodiment, it is preferable that a mass ratio of basic aluminum lactate in the raw material of the inorganic bonding material is from 65 to 100 mass %. That is, it is preferable to include at least 65 mass % of basic aluminum lactate as the raw material of the inorganic bonding material, and all the raw material of the inorganic bonding material may be basic aluminum lactate. Furthermore, it is more preferable that the mass ratio of basic aluminum lactate in the raw material of the inorganic bonding material is from 70 to 100 mass %. Here, basic aluminum lactate is referred to as a compound represented by a chemical formulation of $[Al\,(OH)_{3-n}(C_3H_5O_3)_n].mH_2O$ the manufacturing method of the honeycomb structure of the present embodiment, the mass of basic aluminum lactate is referred to as a mass of $[Al\,(OH)_{3-n}(C_3H_5O_3)_n].mH_2O$ (provided that $0<n<3$ and $1 \le m \le 5$).

Furthermore, as the raw material of the inorganic bonding material, boehmite may further be used in addition to basic aluminum lactate. Needless to say, as the raw material of the inorganic bonding material, the above-mentioned boehmite or another raw material of the inorganic bonding material may be used as long as at least the amount of basic aluminum lactate is from 10 to 35 parts by mass to 100 parts by mass of the total mass of the coarse particle zeolite and the fine particle zeolite. When boehmite is used as the raw material of the inorganic bonding material, a porosity can increase in a case where a total amount of the inorganic bonding material is equal, and the high $NO_x$ purification performance is preferably exhibited.

In a case where basic aluminum lactate and boehmite are used as the raw material of the inorganic bonding material, a mass ratio of basic aluminum lactate in the raw material of the inorganic bonding material is preferably from 65 to 90 mass %, further preferably from 70 to 88 mass %, and especially preferably from 75 to 86 mass %. Furthermore, a mass ratio of boehmite in the raw material of the inorganic bonding material is preferably from 10 to 35 mass %, further preferably from 12 to 30 mass %, and especially preferably from 14 to 25 mass %. Especially, a suitable example of the mass ratio includes a case where in the raw material of the inorganic bonding material, the mass ratio of basic aluminum lactate is from 65 to 90 mass % and the mass ratio of boehmite is from 10 to 35 mass %.

Furthermore, it is preferable that 10 to 50 parts by mass of the raw material of the inorganic bonding material is added to 100 parts by mass of the total mass of the coarse particle zeolite and the fine particle zeolite, to prepare the zeolite raw material. This ratio enables the honeycomb structure which has an excellent $NO_x$ purification performance and also an excellent mechanical strength to be suitably manufactured. It is to be noted that an amount of the raw material of the inorganic bonding material is further preferably from 15 to 47 parts by mass and especially preferably from 17 to 45 parts by mass to 100 parts by mass of the total mass of the coarse particle zeolite and the fine particle zeolite.

There is not any special restriction on a type of chabazite type zeolite which is comprised the coarse particle zeolite, but it is preferable to use zeolite of at least one selected from the group consisting of chabazite, SAPO-34 and SSZ-13. It is to be noted that SAPO is an abbreviation for silico alumino phosphate.

There is not any special restriction on a type of zeolite which is comprised the fine particle zeolite, it is preferable to use at least one selected from the group consisting of a β-type zeolite, a Y-type zeolite, a ZSM-5 type zeolite, and the chabazite type zeolite. The use of the above zeolite as the fine particle zeolite is preferable in that the $NO_x$ purification performance can be maintained to be high in a broad temperature range.

There is not any special restriction on a ratio between the coarse particle zeolite and the fine particle zeolite. For example, a value of a ratio represented by "a volume of the coarse particle zeolite: a volume of the fine particle zeolite" is preferably from 20:80 to 90:10, and further preferably from 30:70 to 75:25.

It is preferable that basic aluminum lactate as the raw material of the inorganic bonding material is dissolved in water, and basic aluminum lactate dissolved in water is mixed with the coarse particle zeolite and the fine particle zeolite, to prepare the zeolite raw material. When basic aluminum lactate is dissolved in water and used, the inorganic bonding material is preferably uniformly dispersed and can then agglomerate around the zeolite particles. In this case, it is more preferable to dissolve basic aluminum lactate as the raw material of the inorganic bonding material in an amount of water which corresponds to twice or more as much as the mass of basic aluminum lactate. It is to be noted that the water to dissolve basic aluminum lactate is a liquid medium to dissolve the raw material of the inorganic bonding material, and the water is not included in the mass of the raw material of the inorganic bonding material.

In the zeolite raw material preparing step, it is preferable that an organic binder or the like is further added and mixed to the hitherto described coarse zeolite particles, fine zeolite particles and the raw material of the inorganic bonding material, to prepare the zeolite raw material.

It is preferable to contain water in the zeolite raw material. It is preferable that a content of the water in the zeolite raw material is from 30 to 70 parts by mass to 100 parts by mass of the zeolite particles. It is to be noted that a part of the water to be contained in the zeolite raw material may be the water to dissolve basic aluminum lactate.

Furthermore, it is preferable to contain the organic binder in the zeolite raw material. Examples of the organic binder include methylcellulose, hydroxypropylmethylcellulose, hydroxypropylethylcellulose, hydroxyethylcellulose, carboxymethylcellulose, and polyvinyl alcohol.

It is to be noted that an amount of the organic binder to be added is preferably from 1 to 20 parts by mass, further preferably from 4 to 15 parts by mass, and especially preferably 6 to 12 parts by mass to 100 parts by mass of the total mass of the zeolite particles and the raw material of the inorganic bonding material. When the amount of the organic binder to be added is excessively small, an extrusion might become difficult, and when the amount of the organic binder to be added is excessively large, the porosity of the honeycomb structure to be obtained might increase, and the strength might decrease.

Furthermore, the zeolite raw material may further contain a dispersing agent or the like. Examples of the dispersing agent include a fatty acid, an acrylic acid, a sorbitan acid, and polyalcohol.

Furthermore, in the zeolite raw material preparing step, at least one selected from the group consisting of inorganic fibers such as an alumina fiber, a silica alumina fiber and a glass fiber may be further added to prepare the zeolite raw material. Further adding such an inorganic fiber to prepare the zeolite raw material enables the mechanical strength of the honeycomb structure obtained to further improve.

There is not any special restriction on an amount of the inorganic fiber to be added. However, when the amount of the inorganic fiber is excessively small, it becomes difficult to exhibit an effect due to the addition of the inorganic fiber. On the other hand, when the amount of the inorganic fiber is excessively large, an amount of another component relatively decreases, and the mechanical strength or the $NO_x$ purification performance might deteriorate. It is preferable that 5 to 20 parts by mass of the inorganic fiber is added to 100 parts by mass of the total mass of the coarse particle zeolite and the fine particle zeolite, to prepare the zeolite raw material. It is to be noted that the amount of the inorganic fiber is further preferably from 6 to 18 parts by mass and especially preferably from 6 to 16 parts by mass.

There is not any special restriction on a method of mixing the zeolite particles and the raw material of the inorganic bonding material, and a known method can be employed. An example of the method includes a method of performing the mixing and kneading by using a double arm kneader manufactured by Honda Machinery Works Co., Ltd.

Furthermore, the manufacturing method may further include a step of performing ion exchange of the coarse particle zeolite and the fine particle zeolite with copper ions. The ion-exchanged zeolite particles with the copper ions can exhibit a suitable $NO_x$ purification performance and a suitable hydrocarbon adsorption ability.

It is to be noted that the step of performing the ion exchange of zeolite may be performed prior to the step of preparing the zeolite raw material. In this case, in the zeolite raw material preparing step, the ion-exchanged coarse particle zeolite and fine particle zeolite are used. Furthermore, to the honeycomb structure obtained through the firing step, the step of performing the ion exchange of zeolite may be performed. Additionally, to perform a simpler manufacturing step, it is preferable to perform the ion exchange to a powder zeolite prior to the zeolite raw material preparing step. Furthermore, the step of performing the ion exchange of zeolite may be performed only to the coarse particle zeolite or only to the fine particle zeolite.

It is to be noted that there is not any special restriction on an ion exchange amount (M+/Al ion molar ratio) of the chabazite type zeolite with the copper ions, it is preferable that the amount is from about 0.04 to 0.06. More specifically, the ion exchange amount of the chabazite type zeolite with the copper ions is preferably from 0.02 to 0.1, further preferably from 0.04 to 0.08, and especially preferably from 0.04 to 0.07. Furthermore, it is preferable that an ion exchange amount of a fine particle zeolite such as the β-type zeolite, the Y-type zeolite or the ZSM-5 type zeolite with the copper ions is about 0.8. More specifically, the ion exchange amount of the β-type zeolite, the Y-type zeolite or the ZSM-5 type zeolite with the copper ions is preferably from 0.4 to 1.5, further preferably from 0.6 to 1.2, and especially preferably from 0.7 to 1.0. It is to be noted that the ion exchange amount can be measured with, for example, an inductively coupled plasma mass spectrometer "SPQ9000 (trade name)" manufactured by Seiko Instruments, Inc. It is to be noted that the above-mentioned ion exchange amount is a molar ratio (M+/Al ions) of a valence number (M+) of the copper ions to aluminum ions (Al ions) in zeolite. When the ion exchange amount is small, a catalytic performance might deteriorate. On the other hand, when the ion exchange amount is excessively large, the catalytic performance might be saturated, and an effect due to the ion exchange might be hard to be exhibited. It is to be noted that the ion exchange amount can be indicated as a ratio (mass %) of a mass of the copper ions to a mass of the exchanged zeolite particles.

An example of a method of subjecting the zeolite particles or the honeycomb structure to an ion exchange treatment with the copper ions includes the following method. Hereinafter, a method of performing the ion exchange of the zeolite particles with the copper ions will be described, First, an ion exchanging solution containing the copper ions to perform the ion exchange is prepared. Specifically, an aqueous solution of copper acetate, copper sulfate or copper nitrate is prepared. It is preferable that a concentration of the ion exchanging solution is from 0.005 to 0.5 (mols/liter). Then, the zeolite particles are immersed into the ion exchanging solution. An immersion time can be suitably determined in accordance with an amount of the copper ions to perform the ion exchange, or the like. Then, the zeolite particles are removed from the ion exchanging solution, followed by drying and calcinating, so that the ion-exchanged zeolite particles can be obtained. As preferable drying conditions, the drying is performed at 80 to 150° C. for 1 to 10 hours. As preferable calcinating conditions, the calcinating is performed at 400 to 600° C. for 1 to 10 hours. Afterward, the raw material of the inorganic bonding material is further added to the obtained zeolite particles, to prepare the zeolite raw material.

In the manufacturing method of the honeycomb structure of the present embodiment, the forming step is performed by using the zeolite raw material obtained by such a method as described above.

The forming step can be performed in conformity with a heretofore known manufacturing method of the honeycomb structure. That is, the prepared zeolite raw material may be extruded into a predetermined shape, to prepare the honeycomb formed body. For example, it is preferable that the zeolite raw material is first kneaded to form a round pillar-shaped formed body, and the round pillar-shaped formed body is extruded to form the honeycomb formed body made of the zeolite raw material. There is not any special restriction on a method of kneading the zeolite raw material to form the round pillar-shaped formed body, and an example of the method includes a method of using a kneader, a vacuum pugmill or the like. During the extrusion, it is preferable to use a die having a desired whole shape, cell shape, partition wall thickness, cell density and the like. As a material of the die, a metal which is hard to wear is preferable.

It is preferable to dry the obtained honeycomb formed body before performing the firing step. There is not any special restriction on a drying method, and examples of the method include an electromagnetic heating method such as microwave heating drying or high-frequency induction heating drying, and an external heating method such as hot air drying or superheated steam drying. Among these methods, such a drying method as described below is more preferable in that the whole formed body can rapidly and uniformly be dried to prevent cracks from being generated. First, a certain amount of water in the honeycomb formed body is dried by the electromagnetic heating method. Afterward, the residual water in the honeycomb formed body is dried by the external heating method.

Then, it is preferable to calcinate the obtained honeycomb formed body prior to the firing step. The calcinating is performed for degreasing, and there is not any special restriction on a calcinating method as long as organic substances such as the organic binder and the dispersing agent can be removed. As preferable calcinating conditions, heating is performed at about 200 to 500° C. in an oxidation atmosphere for about 1 to 20 hours.

Next, the firing step is performed to the honeycomb formed body to prepare the honeycomb structure. That is, the honeycomb formed body is fired to obtain the honeycomb structure of a predetermined shape. There is not any special restriction on a firing method, and the firing can be performed by using an electric furnace, a gas furnace, or the like. It is to be noted that a firing temperature is preferably from 500 to 750° C. and further preferably from 550 to 700° C. In a case where the firing temperature is excessively low, the strength might decrease, and in a case where the temperature is excessively high, a zeolite performance might deteriorate. Furthermore, as preferable firing conditions during the firing, heating is performed at the above temperature in the air atmosphere for 1 to 10 hours.

As described above, the honeycomb structure can be manufactured. It is to be noted that in a case where the ion-exchanged zeolite particles are not used as the zeolite particles, an ion exchanging process with the copper ions may be performed to the fired honeycomb formed body. Additionally, the hitherto described manufacturing method of the honeycomb structure is one example, and modifications, improvements and the like can suitably be performed without departing from the gist of the present invention.

Figure 2:
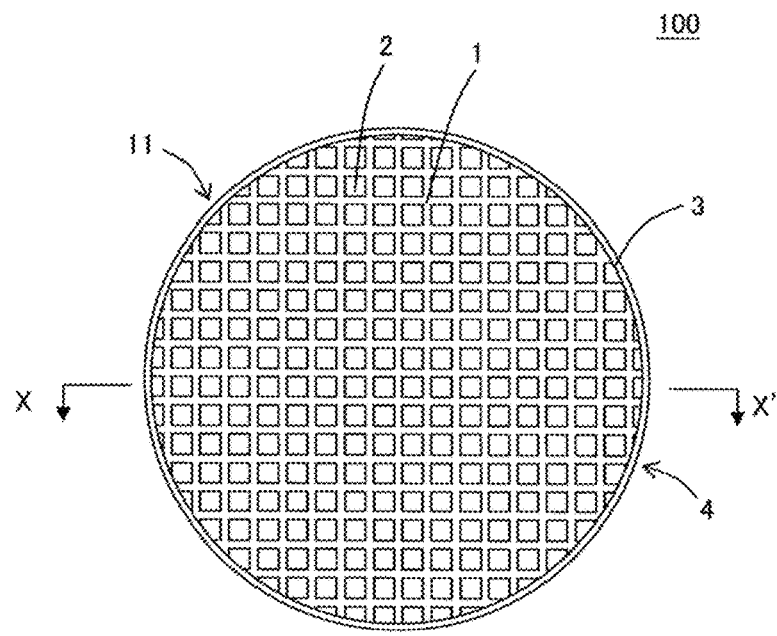
FIG. 2 is a plan view schematically showing a first end face of the honeycomb structure shown in FIG. 1.
Figure 3:
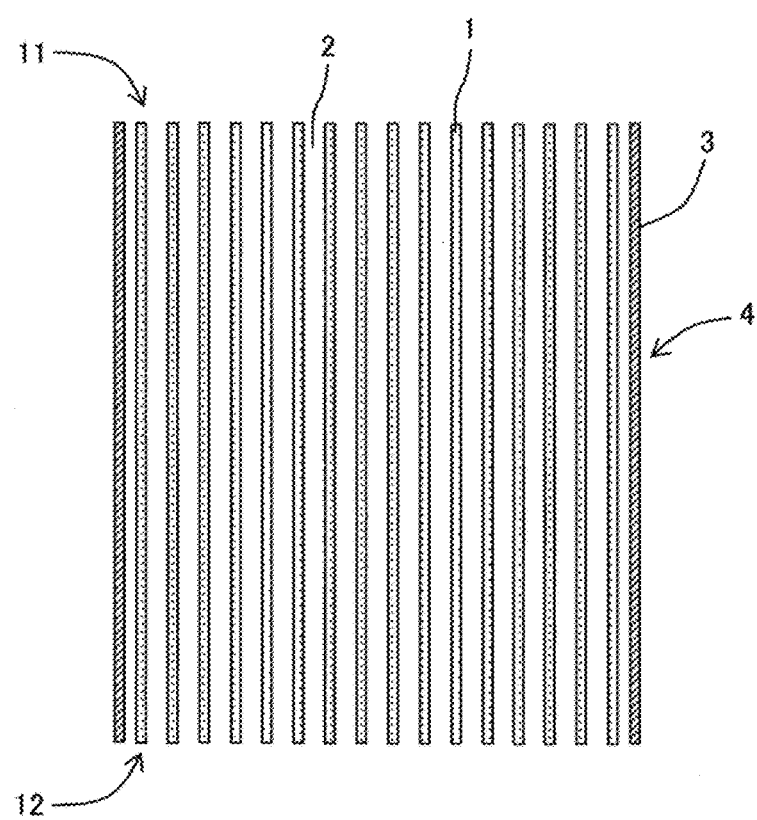
FIG. 3 is a cross-sectional view schematically showing a cross section along the X-X' line of FIG. 2.

(2) Honeycomb Structure:

Hereinafter, the honeycomb structure manufactured by the manufacturing method of the honeycomb structure of the present invention will be described. Here, FIG. 1 is a perspective view schematically showing the honeycomb structure manufactured by the manufacturing method of the honeycomb structure of the present invention. FIG. 2 is a plan view schematically showing a first end face of the honeycomb structure shown in FIG. 1. FIG. 3 is a cross-sectional view schematically showing a cross section along the X-X' line of FIG. 2.

As shown in FIG. 1 to FIG. 3, a honeycomb structure 100 includes a honeycomb structure body 4 made of a zeolite material containing at least a coarse particle zeolite, a fine particle zeolite, and an inorganic bonding material. The honeycomb structure body 4 has partition walls 1 defining a plurality of cells 2 which extend from a first end face 11 to a second end face 12 and become through channels for a fluid.

Figure 4:
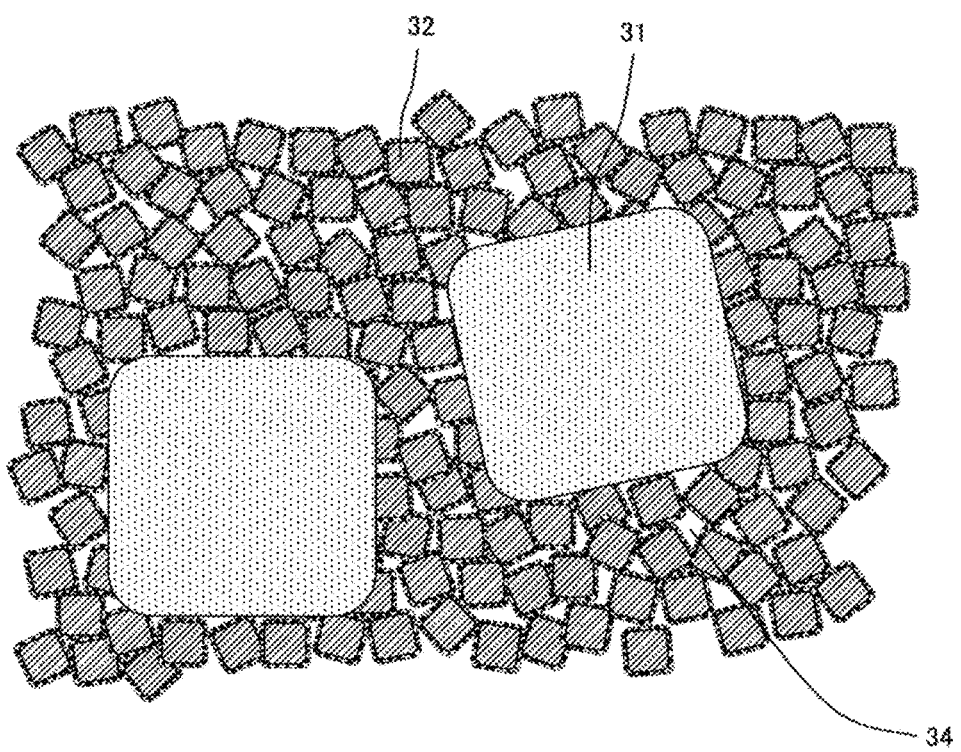
FIG. 4 is an explanatory view schematically showing behaviors of coarse zeolite particles and fine zeolite particles in the zeolite material of the honeycomb structure manufactured by the manufacturing method of the honeycomb structure of the present invention.

The coarse particle zeolite included in the zeolite material is a chabazite type zeolite in which an average particle diameter of primary particles is 2 μm or more and 6 μm or less. Furthermore, in the fine particle zeolite contained in the zeolite material, an average particle diameter of primary particles is 0.02 μm or more and smaller than 2 μm. That is, in the honeycomb structure 100 of the present embodiment, the average particle diameter of the coarse particle zeolite made of the chabazite type zeolite is relatively large and the average particle diameter of the fine particle zeolite is relatively small. Consequently, the zeolite material which is comprised the honeycomb structure body 4 has a state where, for example, as shown in FIG. 4, fine zeolite particles 32 having small particle diameters are arranged to surround coarse zeolite particles 31 having large particle diameters. In this case, small clearances might be generated between the coarse zeolite particle 31 and the fine zeolite particle 32, and between the fine zeolite particles 32, respectively, and the clearances form pores 34 of a porous body. Here, as shown in FIG. 4, the pores 34 formed between the coarse zeolite particle 31 and the fine zeolite particle 32, and between the fine zeolite particles 32, respectively, will be referred to as first pores 34 sometimes.

Figure 5:
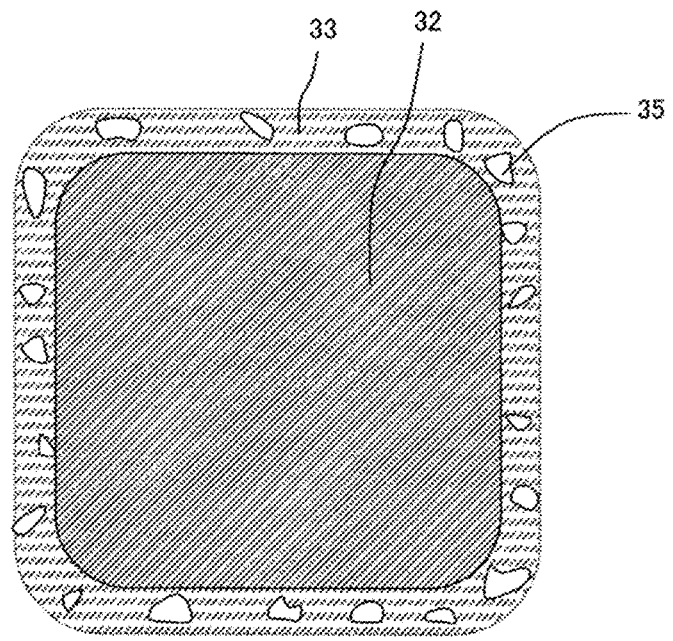
FIG. 5 is an explanatory view schematically showing an enlarged state of the fine zeolite particle shown in FIG. 4.

Furthermore, when the fine zeolite particle 32 shown in FIG. 4 is enlarged, an inorganic bonding material 33 is disposed to surround the fine zeolite particle 32 in a periphery of the fine zeolite particle 32 as shown in FIG. 5. Further, in the inorganic bonding material 33, remarkably small pores 35 are formed. The pores 35 formed in the inorganic bonding material 33 will be referred to as second pores 35 sometimes. Pore diameters of the second pores 35 are smaller than those of the first pores 34 shown in FIG. 4. That is, in a porous zeolite material 40 shown in FIG. 4, in addition to the first pores 34 formed among the zeolite particles, the remarkably small second pores 35 (see FIG. 5) which are not shown in FIG. 4 are formed in the inorganic bonding material 33.

Here, FIG. 4 is an explanatory view schematically showing behaviors of the coarse zeolite particles and the fine zeolite particles in the zeolite material which is comprised the honeycomb structure body in the honeycomb structure manufactured by the manufacturing method of the honeycomb structure of the present invention. FIG. 5 is an explanatory view schematically showing the enlarged state of the fine zeolite particle shown in FIG. 4. It is to be noted that FIG. 4 and FIG. 5 are schematic views each showing a simplified microstructure of the zeolite material, and in an actual zeolite material, a shape of each zeolite particle and details of an agglomerated/dispersed state and another state of the inorganic bonding material might be different from those shown in the drawing.

In the honeycomb structure 100, it is preferable that in the zeolite material which is comprised the honeycomb structure body 4, a ratio of a volume of pores having pore diameters of 0.02 to 0.15 μm to a volume of all pores is 42% or less. That is, in the honeycomb structure body 4 of the honeycomb structure 100, it is preferable that a ratio of a total volume of pores having pore diameters smaller than 0.02 μm and pores having pore diameters in excess of 0.15 μm to the volume of all the pores is in excess of 58%. Here, as shown in FIG. 4 and FIG. 5, the pores 34 and 35 roughly divided into two types in accordance with a size of the pore diameter are formed around the coarse particle zeolite and the fine particle zeolite. For example, the pores having the pore diameters smaller than 0.02 μm are mainly the second pores 35 shown in FIG. 5, and the pores having the pore diameters in excess of 0.15 μm are mainly the first pores 34 shown in FIG. 4.

The honeycomb structure 100 manufactured by the manufacturing method of the honeycomb structure of the present invention produces the effect that the honeycomb structure has an excellent $NO_x$ purification performance and also an excellent mechanical strength, especially a compressive strength. Especially, the zeolite material which is comprised the honeycomb structure body 4 is made of a zeolite material containing the coarse particle zeolite made of the chabazite type zeolite in which the average particle diameter of the primary particles is 2 μm or more and 6 μm or less, and hence, it is possible to achieve a high $NO_x$ purification performance.

Furthermore, when the ratio of the volume of the pores having the pore diameters of 0.02 to 0.15 μm satisfies the above numeric range, it is possible to achieve the high mechanical strength. That is, when the ratio of the volume of the pores having the pore diameters of 0.02 to 0.15 μm satisfies the above numeric range, it can be considered that in the microstructure of the zeolite material, the pores having the pore diameters smaller than 0.02 μm and the pores having the pore diameters in excess of 0.15 μm are formed as much as suitable volumes, respectively. Further, when the volume of the pores having the pore diameters smaller than 0.02 μm is sufficiently large, it can be considered that the microstructure is agglomerated so that the inorganic bonding material comparatively densely surrounds the fine zeolite particles. Further, in this way, the fine zeolite particles surrounded with the agglomerated inorganic bonding material are further arranged to surround the coarse zeolite particles, whereby the pores having the pore diameters in excess of 0.15 μm are more selectively formed. Consequently, in the honeycomb structure manufactured by the manufacturing method of the honeycomb structure of the present invention, the ratio of the volume of the pores having the pore diameters of 0.02 to 0.15 μm is remarkably low as compared with a conventional honeycomb structure, and as a result, the high mechanical strength is exhibited. Hereinafter, the ratio of the volume of the pores having predetermined pore diameters to the volume of all the pores will be simply referred to as a pore volume ratio sometimes.

Figure 6:
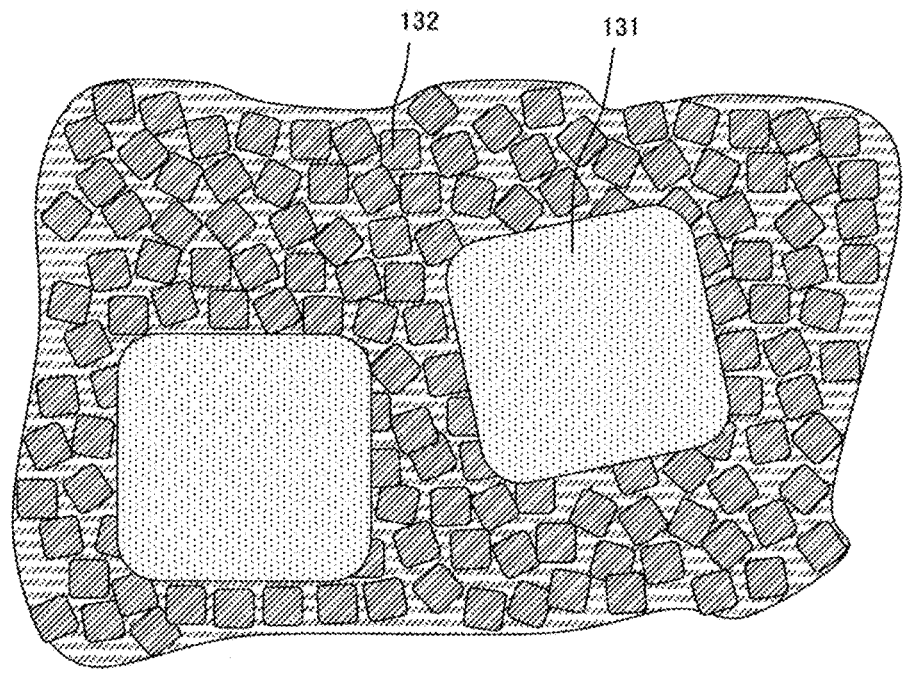
FIG. 6 is an explanatory view schematically showing behaviors of coarse zeolite particles and fine zeolite particles in another zeolite material.
Figure 7:
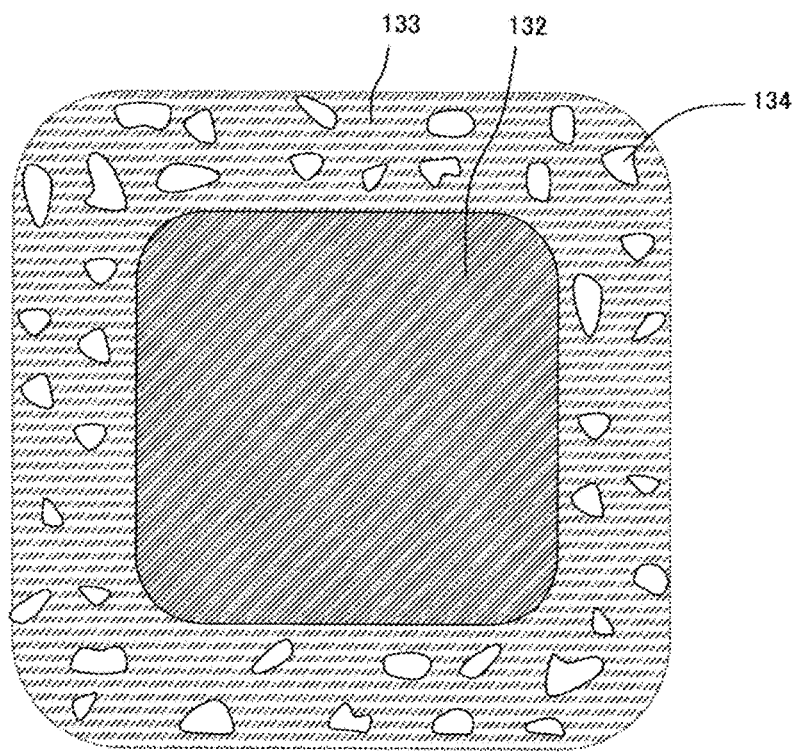
FIG. 7 is an explanatory view schematically showing an enlarged state of the fine zeolite particle shown in FIG. 6.

Hereinafter, there will be described an example where the inorganic bonding material is not agglomerated around the zeolite particles, especially around the fine zeolite particles but is dispersed in a comparatively broad range, with reference to FIG. 6 and FIG. 7. Here, FIG. 6 is an explanatory view schematically showing behaviors of coarse zeolite particles and fine zeolite particles in another zeolite material. FIG. 7 is an explanatory view schematically showing an enlarged state of the fine zeolite particle shown in FIG. 6.

As shown in FIG. 6 and FIG. 7, in a case where an inorganic bonding material 133 is not agglomerated around fine zeolite particles 132, but the inorganic bonding material 133 is dispersed in a comparatively broad range, the fine zeolite particles 132 and the inorganic bonding material 133 are broadly distributed around coarse zeolite particles 131. For example, in a case where the inorganic bonding material 133 is dispersed in a comparatively broad range as shown in FIG. 7, a density of the inorganic bonding material 133 which is present around the fine zeolite particles 132 decreases, and a range in which the inorganic bonding material 133 is present around the fine zeolite particles 132 broadens. In such a case, as shown in FIG. 6, the inorganic bonding material 133 is broadly dispersed among a plurality of coarse zeolite particles 131, and the fine zeolite particles 132 are comparatively uniformly distributed in the inorganic bonding material 133. In a zeolite material 140 of such a state, the inorganic bonding material 133 is not agglomerated, and hence the ratio of the volume of the pores having the pore diameters of 0.02 to 0.15 μm increases. Consequently, the ratio of the volume of the pores having the pore diameters of 0.02 to 0.15 μm to the volume of all the pores is in excess of 42%, and the pore volume ratio of the above-mentioned honeycomb structure is not satisfied. Further, in the zeolite material 140 shown in FIGS. 6 and 7, the inorganic bonding material 133 is not agglomerated around the fine zeolite particles 132, but the inorganic bonding material 133 is dispersed in the comparatively broad range, and hence strength decreases. On the other hand, in the zeolite material 40 shown in FIG. 4 and FIG. 5, the inorganic bonding material 33 is agglomerated around each fine zeolite particle 32, and the inorganic bonding material 33 forms a comparatively dense neck portion, thereby to increase the strength.

The pore volume ratio of the zeolite material can be measured by the following method. First, an accumulated pore volume of the honeycomb structure body made of the zeolite material is measured. The accumulated pore volume can be measured with a mercury porosimeter. An example of the mercury porosimeter includes "PoreMaster 60GT (trade name)" which is a fully automatic multifunctional mercury porosimeter manufactured by Quantachrome Instrument. For example, "the pore volume of the pores having the pore diameters of 0.02 to 0.15 μm" can be obtained by subtracting a value of the accumulated pore volume of the pores having the pore diameter of 0.02 μm from the value of the accumulated pore volume of the pores having the pore diameter of 0.15 μm. A pore volume of pores having another pore diameter can be also obtained by a similar method. Further, the pore volume ratio can be calculated as a percentage to the volume of all the pores.

It is preferable that in the zeolite material, the ratio of the volume of the pores having the pore diameters smaller than 0.02 μm to the volume of all the pores is from 8 to 20%. Then, it is further preferable that in the zeolite material, the ratio of the volume of the pores having the pore diameters in excess of 0.15 μm to the volume of all the pores is from 40 to 60%, and the ratio of the volume of the pores having the pore diameters of 0.52 μm or more to the volume of all the pores is 5% or less. Such a ratio enables the mechanical strength of the honeycomb structure to further increase.

Furthermore, the average particle diameters of the coarse particle zeolite and the fine particle zeolite in the zeolite material can be measured by the following method. That is, in a case where it is difficult to measure the average particle diameters of the coarse particle zeolite and the fine particle zeolite in the zeolite raw material, the average particle diameters of the respective zeolite particles can be measured by the following method. First, a surface or a broken surface of the honeycomb structure body made of the zeolite material or a polished surface obtained by polishing the broken surface is observed with a scanning electron microscope, and an observed image is imaged. Hereinafter, the scanning electron microscope will be referred to as "SEM" sometimes. The "SEM" is an abbreviation for "the scanning electron microscope". Furthermore, a photograph imaged with the SEM is referred to as the SEM photograph sometimes. In the observation with the SEM, three viewing fields of each of the coarse particle zeolite and the fine particle zeolite are observed. That is, in the observation with the SEM, an observation to measure the average particle diameter of the particles of the coarse particle zeolite is performed as to three viewing fields each having a size including at least 100 particles of the coarse particle zeolite. Next, the size of the viewing field is changed, and an observation to measure the average particle diameter of the fine particle zeolite is performed as to three viewing fields each having a size including at least 100 particles of the fine particle zeolite. It is possible to specify whether the zeolite particle in the viewing field is the particle of the coarse particle zeolite or the particle of the fine particle zeolite or not, in accordance with a method which will be described later.

Next, as to the zeolite particles in the image, long diameters and short diameters are measured, respectively, and arithmetic mean values of the long diameters and the short diameters are defined as the particle diameters of the zeolite particles. The long diameters and short diameters of the zeolite particles can be measured, for example, by an image analysis software. An example of the image analysis software includes "Image-Pro Plus (trade name)" manufactured by Media Cybernetics, Inc. For example, when the particle diameters of the particles of the coarse particle zeolite are measured, there are measured the particle diameters of 100 particles of the coarse particle zeolite which are present in each of the images of three viewing fields each including at least 100 particles of the coarse particle zeolite. Similarly, when the particle diameters of the particles of the fine particle zeolite are measured, there are measured the particle diameters of 100 particles of the fine particle zeolite which are present in each of the images of three viewing fields each including at least 100 particles of the fine particle zeolite. The average particle diameter of the coarse zeolite particles and the average particle diameter of the fine zeolite particles are arithmetic mean values calculated for each of the images of the three viewing fields.

It is to be noted that the zeolite particles in the SEM image can be discriminated by the following method. Here, in a case of zeolite in which a type of coarse particle zeolite is different from a type of fine particle zeolite and in a case of zeolite in which the type of coarse particle zeolite is the same as the type of fine particle zeolite, there are two discrimination methods.

First, there will be described the discrimination method of particles in the case of zeolite in which the type of coarse particle zeolite is different from the type of fine particle zeolite, i.e., a case where the fine particle zeolite is not the chabazite type zeolite. In this case, a crystal phase of the zeolite particle in the SEM image is specified by electron backscatter diffraction (EBSD), whereby the zeolite particles can be discriminated. Hereinafter, analysis by the electron backscatter diffraction will be referred to as "the EBSD analysis" sometimes. By this EBSD analysis, the zeolite particles in the image are classified into chabazite type zeolite particles and the other zeolite particles. Then, the particles classified as the chabazite type zeolite particles are conveniently defined as the coarse zeolite particles, and the other zeolite particles are conveniently defined as the fine zeolite particles.

Next, there will be described the discrimination method of particles in the case of the zeolite in which the type of coarse particle zeolite is the same as the type of fine particle zeolite, i.e., a case where the fine particle zeolite is the chabazite type zeolite. In this case, there are prepared SEM images for three viewing fields each including 100 or more zeolite particles in which the arithmetic mean value of the long diameters and short diameters is 2 μm or more. In the SEM images for the three viewing fields, the surface or the broken surface of the honeycomb structure body made of the zeolite material or a polished surface obtained by polishing the broken surface is measured in an optional region. Next, the long diameters and short diameters of all the zeolite particles in each SEM image are measured, respectively, and the arithmetic mean values of the long diameters and the short diameters of the respective zeolite particles are defined as the particle diameters of the respective zeolite particles. Additionally, in the measurement of the long diameter and the short diameter of each zeolite particle, the zeolite particle in which "the arithmetic mean value of the long diameter and the short diameter" is 0.001 μm or more is defined as a measurement target. When the long diameter and the short diameter of each zeolite particle are measured, a plurality of SEM images may separately be prepared in each of which an observation range is enlarged at an optional magnification. Further, the long diameter and the short diameter of the zeolite particle in the SEM image enlarged in accordance with a size of the zeolite particle are suitably measured, and the particle diameter of each zeolite particle may be obtained on the basis of the measured value.

Next, on the basis of the particle diameters of the zeolite particles which are obtained from the SEM images, a particle size distribution diagram is prepared in which the abscissa indicates "the particle diameters of the zeolite particles" and the ordinate indicates "the number of the zeolite particles". Then, it is confirmed whether the particle size distribution diagram shows a bimodal or more particle size distribution diagram. In a case of the distribution showing the bimodal distribution, the zeolite material includes the zeolite particles having relatively large particle diameters and the zeolite particles having relatively small particle diameters.

Next, in the particle size distribution, the particle diameter having a maximum frequency in a range of the particle diameters of 2 μm or more is defined as the average particle diameter of the coarse particle zeolite. Furthermore, in the particle size distribution, the particle diameter having a maximum frequency in a range of the particle diameters smaller than 2 μm is defined as the average particle diameter of the fine particle zeolite. Then, in the above particle size distribution diagram, the zeolite particles which comprise the distribution having the maximum frequency in the range of the particle diameters of 2 μm or more are conveniently defined as the coarse zeolite particles. Furthermore, in the above particle size distribution diagram, the zeolite particles which comprise the distribution having the maximum frequency in the range of the particle diameters smaller than 2 μm are conveniently defined as the fine zeolite particles.

Next, the type of zeolite is conveniently confirmed by the above-mentioned methods for the two cases as to the respective zeolite particles classified into the coarse zeolite particles and the fine zeolite particles. For example, as to all the zeolite particles in the SEM images, it is confirmed whether the type of zeolite is the chabazite type zeolite or not. In the confirmation of the type of zeolite, the crystal phase of zeolite can be specified by the above EBSD analysis or analysis with a transmission electron microscope (TEM). In the transmission electron microscope analysis, the zeolite material observed in the SEM image is processed into a thin specimen, and the processed thin specimen is analyzed by the selected area electron diffraction with the transmission electron microscope, whereby the crystal phase of zeolite can be specified. In this way, the average particle diameters of the coarse particle zeolite and the fine particle zeolite can be obtained.

Furthermore, as to zeolite particles in each of which the arithmetic mean value of the long diameter and the short diameter is 2 μm or more, its volume ratio to a total volume of the zeolite particles is preferably from 10 to 95 vol % and further preferably from 15 to 87 vol %. The volume ratio of the zeolite particles in each of which the arithmetic mean value of the long diameter and the short diameter is 2 μm or more can be also obtained from the SEM image used in obtaining the particle diameters of the zeolite particles.

The volume ratio of the inorganic bonding material in the zeolite material can be calculated from the SEM photograph used in obtaining, for example, the above-mentioned "average particle diameter of the zeolite particles". That is, the particle diameters or an occupying area of the zeolite particles, and an occupying area of the inorganic bonding material are obtained from the above-mentioned SEM photograph by using an image analysis software, and from these values, a volume of all the zeolite particles, and the volume of the inorganic bonding material can be calculated. Furthermore, in a case where the zeolite material includes an inorganic fiber or another component, a volume of the other component is also calculated by a method similar to the above-mentioned method. As the image analysis software, for example, "Image-Pro Plus (trade name)" manufactured by Media Cybernetics, Inc. can be used. Here, "the volume of all the zeolite particles" means a total value of the volumes of the respective zeolite particles, i.e., a volume which does not include the clearances (voids) among the zeolite particles. Therefore, a total of "the volume of all the zeolite particles" which is obtained from the particle diameters of the zeolite particles, "the volume of the inorganic bonding material" which is obtained from the occupying area of the inorganic bonding material, and "the volume of the other component" becomes a value of "a denominator" in the volume ratio of the inorganic bonding material. That is, the volume ratio of the inorganic bonding material can be represented by Equation (1) mentioned below. It is to be noted that, for example, in a case of powder of particles used as the raw material, the volume of all the zeolite particles is a value obtained by dividing a mass of all the zeolite particles by a density thereof.

the ratio of the volume of the inorganic bonding material={(the volume of the inorganic bonding material)/(the volume of all the zeolite particles+the volume of the inorganic bonding material+the volume of the other component)}   Equation (1):

The honeycomb structure can be suitably used as an exhaust gas purification member to purify $NO_x$ and the like contained in an exhaust gas emitted from a car engine, a construction machine engine, an industrial stationary engine, a combustion device or the like or to adsorb hydrocarbons and the like.

It is preferable that an area of a cross section of the honeycomb structure which is perpendicular to a cell extending direction is from 300 to 200000 $mm^2$. When the area is smaller than 300 $mm^2$, an area which can treat the exhaust gas decreases, and additionally, a pressure loss might increase. When the area is larger than 200000 $mm^2$, the strength of the honeycomb structure might decrease.

Furthermore, as shown in FIG. 1, it is preferable that the honeycomb structure 100 includes the circumferential wall 3 disposed to surround a circumference of all of the partition walls 1. A material of the circumferential wall 3 does not necessarily have to be the same as that of the partition walls. However, when a material of a circumferential portion is noticeably different in viewpoints of a heat resistance, a thermal expansion coefficient and the like, problems such as damages on the partition walls might occur, and hence it is preferable to mainly include the same material or to mainly contain a material having equivalent physical properties. The circumferential wall 3 may be formed integrally with the partition walls by the extrusion, or after the formation, the circumferential portion may be processed into a desired shape and the circumferential portion may be coated.

There is not any special restriction on a shape of the cells in the honeycomb structure, and examples of the cell shape include a triangular shape, a quadrangular shape, a hexagonal shape, an octagonal shape, a round shape, and any combination of these shapes. The shape of the cells means a shape of the cells in the cross section perpendicular to the extending direction of the cells.

A thickness of the partition walls in the honeycomb structure is preferably from 50 μm to 2 mm and further preferably from 100 μm to 350 μm. When the thickness is smaller than 50 μm, the strength of the honeycomb structure might decrease. When the thickness is larger than 2 mm, the purification performance might deteriorate, or the pressure loss might increase when the gas passes through the honeycomb structure. Furthermore, it is preferable that a thickness of the circumferential wall forming the outermost circumference of the honeycomb structure is 10 mm or less. When the thickness is larger than 10 mm, the area to perform the exhaust gas purification treatment might decrease.

For example, a cell density of the honeycomb structure is preferably from 7.8 to 155.0 cells/$cm^2$ and further preferably from 31.0 to 93.0 cells/cm². When the cell density is larger than 155.0 cells/cm², the pressure loss might increase when the gas passes through the honeycomb structure. When the cell density is smaller than 7.8 cells/cm², the area to perform the exhaust gas purification treatment might decrease.

An example of the whole shape of the honeycomb structure is a pillar shape in which each end face has a round shape, an oval shape, or the like. For example, as a size of the honeycomb structure in the case of the round pillar shape, a diameter of a bottom surface is preferably from 20 to 500 mm and further preferably from 70 to 300 mm. Furthermore, a length of the honeycomb structure in a central axis direction is preferably from 10 to 500 mm, and further preferably from 30 to 300 mm.

EXAMPLES

Hereinafter, the present invention will further specifically be described with reference to examples, but the present invention is not limited to these examples.

Example 1

As a coarse particle zeolite, there was prepared SAPO-34 which was 4.1 mass % ion-exchanged with copper ions and in which an average particle diameter was 3.9 μm. Furthermore, as a fine particle zeolite, there was prepared a β-type zeolite which was 6.3 mass % ion-exchanged with copper ions and in which an average particle diameter was 0.4 μm. Table 1 shows the types and average particle diameters of the coarse particle zeolite and the fine particle zeolite used in Example 1. In "a column of zeolite" of Table 1, "Cu-SAPO-34" means SAPO-34 which was ion-exchanged with the copper ions. Furthermore, in "the column of zeolite" of Table 1, "Cu-β" means the β-type zeolite which was ion-exchanged with the copper ions. The average particle diameter of each zeolite was a median diameter (d50) in a particle diameter distribution of powder containing particles of each zeolite, and was measured by a laser diffraction scattering method which conformed to JIS R1629.

Furthermore, as an inorganic bonding material, 155 g of basic aluminum lactate and 49 g of boehmite were prepared. As basic aluminum lactate, there was prepared "M160-P (trade name)" which was basic aluminum lactate manufactured by Taki Chemical Co., Ltd. Boehmite having a specific surface area of 130 m²/g was prepared. Basic aluminum lactate was dissolved in an amount of water which was twice as much as a mass of basic aluminum lactate, i.e., 310 g of water.

Furthermore, an alumina silica fiber and methylcellulose were added to the coarse particle zeolite, the fine particle zeolite and the inorganic bonding material prepared as described above, to prepare a zeolite raw material. When preparing the zeolite raw material, 73 g of alumina silica fiber was added, and 35 g of methylcellulose was added. The alumina silica fiber was used in which an average fiber diameter was 3 μm and an average fiber length was 100 μm. The preparation of the zeolite raw material was performed by mixing the above-mentioned respective raw materials by using a double arm kneader manufactured by Honda Machinery Works Co., Ltd. for 10 minutes, and further performing mixing and kneading for 40 minutes while adding water to adjust a viscosity. Table 2 shows a formulation of the zeolite raw material.

An obtained kneaded material of zeolite was extruded to obtain a honeycomb formed body in which a thickness of partition walls was 200 μm and a cell density was 93 cells/cm². The obtained honeycomb formed body was dried at 80° C. in a hot air drier for 12 hours. Afterward, the dried honeycomb formed body was degreased at 450° C. in a firing furnace for 5 hours, and fired at 700° C. for 4 hours, thereby to obtain a honeycomb structure including a honeycomb structure body made of a zeolite material.

As to the zeolite material which is comprised the honeycomb structure body of the obtained honeycomb structure, values of (1) to (9) mentioned below were obtained. Table 4 shows the results.

(1) A ratio (%) of a volume of the coarse particle zeolite (a coarse particle chabazite type zeolite) to a volume of the whole zeolite material.

(2) A ratio (vol %) of a volume of alumina derived from basic aluminum lactate to the volume of the whole zeolite material.

(3) A ratio (vol %) of a volume of the inorganic bonding material to the volume of the whole zeolite material.

(4) A ratio (A1/A2) of a volume A1 of alumina derived from basic aluminum lactate to a volume A2 of alumina derived from boehmite.

(5) A pore volume (ml/g) of pores having pore diameters of 0.02 to 0.15 μm.

(6) A total pore volume (ml/g).

(7) A pore volume ratio (%) of pores having pore diameters of 0.02 to 0.15 μm.

(8) A porosity (%).

(9) A compressive strength (MPa).

As to measurements of the above-mentioned (1) to (4), each value was obtained by calculating a volume from a mass of each raw material used in a zeolite raw material shown in Table 2. It was considered that when a honeycomb formed body was fired, a total amount of basic aluminum lactate was dehydrated and decarbonized to change to alumina, and a volume of basic aluminum lactate was calculated.

Measurements of the above-mentioned (5) to (7) were performed by the following method. First, an accumulated pore volume of the honeycomb structure body made of the zeolite material was measured with a mercury porosimeter. As the mercury porosimeter, there was used "PoreMaster 60GT (trade name)" of a fully automatic multifunctional mercury porosimeter manufactured by Quantachrome Instrument. Then, for example, "a pore volume (ml/g) of pores having pore diameters of 0.02 to 0.15 μm" was obtained by subtracting a value of an accumulated pore volume of pores having a pore diameter of 0.02 μm from a value of an accumulated pore volume of pores having a pore diameter of 0.15 μm. "A total pore volume (ml/g)" means a volume of all pores per gram of the zeolite material. "A pore volume ratio (%) of the pores having the pore diameters of 0.02 to 0.15 m" was calculated as a percentage of the pore volume (ml/g) of the pores having the pore diameters of 0.02 to 0.15 μm to the total pore volume.

Measurement of the above-mentioned (8) was performed by the following method. First, the porosity was calculated in Equation (4) mentioned below by use of a pore volume per unit mass of pores having pore diameters of 3 nm to 180 μm which was measured by mercury penetration method and a true density of the honeycomb structure.

$$\text{the porosity} = \text{the pore volume}/(\text{the pore volume} + 1/\text{the true density of the honeycomb structure body}) \times 100 \quad \text{Equation (4):}$$

Furthermore, in Equation (4) mentioned above, the pore volume was measured with "PoreMaster 60GT (trade name)" of the fully automatic multifunctional mercury porosimeter manufactured by Quantachrome Instrument. Furthermore, as the true density of the honeycomb structure body concerning zeolite, a value of 1.85 g/cm³ was used, and as the true density concerning the inorganic bonding material, there was used a value measured with "AccuPyc 1330 (trade name)" of a dry process automatic densimeter manufactured by Micrometrics.

Measurement of the above-mentioned (9) was performed by the following method. From the honeycomb structure, a round pillar shape having a diameter of 25 mm and a length of 25 mm in a cell extending direction was cut out as a test piece. In "Auto Graph AG10TD (trade name)" manufactured by Shimadzu Corporation, a compressive load was applied at a test rate (a crosshead feed rate) of 0.5 mm/minute, to measure a maximum load of the test piece. A value obtained by dividing the measured maximum load by a cross-sectional area of the test piece (a cross-sectional area of the round pillar shape having the diameter of 25 mm) was obtained as the compressive strength (MPa). Additionally, the measurement was performed by sandwiching a cardboard between a jig used in measuring the maximum load and a contact surface of the test piece for the purpose of relieving a local load.

TABLE 1

|  | Type of zeolite | Average particle dia. (μm) |
|---|---|---|
| Coarse particle zeolite | Cu-SAPO-34 | 3.9 |
|  | Coarse particle Cu-chabazite | 4.4 |
| Fine particle zeolite | Cu-β | 0.4 |
|  | Fine particle Cu-chabazite | 0.6 |

TABLE 2

|  | Example 1 | Example 2 | Example 3 | Example 4 | Example 5 | Example 6 | Example 7 |
|---|---|---|---|---|---|---|---|
| Cu-SAPO-34 (g) | 158 | 158 | 158 | 158 | 315 | — | — |
| Coarse particle Cu-chabazite (g) | — | — | — | — | — | 158 | 158 |
| Cu-β (g) | 293 | 293 | 293 | 293 | 135 | 293 | — |
| Fine particle Cu-chabazite (g) | — | — | — | — | — | — | 293 |
| Basic aluminum lactate (g) | 155 | 101 | 67 | 51 | 69 | 67 | 67 |
| Boehmite (g) | 49 | — | 11 | 22 | 34 | 11 | 11 |
| Alumina silica fiber (g) | 73 | 24 | 24 | 24 | 25 | 24 | 24 |
| Methylcellulose (g) | 35 | 31 | 35 | 31 | 32 | 35 | 35 |

TABLE 3

|  | Comparative Example 1 | Comparative Example 2 | Comparative Example 3 | Comparative Example 4 | Comparative Example 5 | Comparative Example 6 |
|---|---|---|---|---|---|---|
| Cu-SAPO-34 (g) | 158 | 158 | 158 | 158 | 315 | 315 |
| Cu-β (g) | 293 | 293 | 293 | 293 | 135 | 135 |
| Basic aluminum lactate (g) | — | — | 34 | 34 | — | — |
| Alumina sol (g) | 200 | — | — | — | 92 | — |
| Boehmite (g) | 49 | 33 | 22 | 45 | 34 | 56 |
| Alumina silica fiber (g) | 73 | 24 | 24 | 25 | 25 | 25 |
| Methylcellulose (g) | 34 | 30 | 31 | 31 | 32 | 64 |

TABLE 4

|  | Example 1 | Example 2 | Example 3 | Example 4 | Example 5 | Example 6 | Example 7 |
|---|---|---|---|---|---|---|---|
| Volume ratio (vol %) of coarse particle chabazite type zeolite | 35 | 35 | 35 | 35 | 70 | 35 | 35 |
| Volume ratio (vol %) of alumina derived from basic aluminum lactate to volume of whole zeolite material | 4 | 3 | 2 | 1.5 | 2 | 2 | 2 |
| Volume ratio (vol %) of inorganic bonding material to volume of whole zeolite material | 8 | 3 | 3 | 3.5 | 5 | 3 | 3 |
| Ratio (A1/A2) of volume A1 of alumina derived from basic aluminum lactate to volume A2 of alumina derived from boehmite | 1 | — | 2 | 0.75 | 0.67 | 2 | 2 |
| Pore volume of pores having pore diameters of 0.02 to 0.15 μm (ml/g) | 0.1190 | 0.1080 | 0.1381 | 0.1925 | 0.0649 | 0.1312 | 0.1522 |
| Total pore volume (ml/g) | 0.3048 | 0.3629 | 0.3958 | 0.4715 | 0.2470 | 0.3842 | 0.4240 |
| Pore volume ratio of pores having pore diameters of 0.02 to 0.15 μm (%) | 39 | 30 | 35 | 41 | 26 | 34 | 36 |
| Porosity (%) | 36 | 38.1 | 41 | 42.3 | 30.5 | 39.8 | 41.5 |
| Compressive strength (MPa) | 17 | 19.1 | 11.2 | 5.3 | 18.5 | 13.4 | 12.1 |

TABLE 5

| | Comparative Example 1 | Comparative Example 2 | Comparative Example 3 | Comparative Example 4 | Comparative Example 5 | Comparative Example 6 |
|---|---|---|---|---|---|---|
| Volume ratio (vol %) of coarse particle chabazite type zeolite | 35 | 35 | 35 | 35 | 70 | 70 |
| Volume ratio (vol %) of alumina derived from basic aluminum lactate to volume of whole zeolite material | — | — | 1 | 1 | — | — |
| Volume ratio (vol %) of inorganic bonding material to volume of whole zeolite material | 8 | 3 | 3 | 5 | 5 | 5 |
| Ratio (A1/A2) of volume A1 of alumina derived from basic aluminum lactate to volume A2 of alumina derived from boehmite | — | — | 0.5 | 0.25 | — | — |
| Pore volume of pores having pore diameters of 0.02 to 0.15 μm (ml/g) | 0.2793 | 0.3799 | 0.2076 | 0.3246 | 0.1745 | 0.1446 |
| Total pore volume (ml/g) | 0.3761 | 0.4420 | 0.4561 | 0.4734 | 0.2771 | 0.3345 |
| Pore volume ratio of pores having pore diameters of 0.02 to 0.15 μm (%) | 74 | 86 | 46 | 69 | 63 | 43 |
| Porosity (%) | 41.8 | 42.3 | 42.1 | 43.8 | 33.7 | 36.6 |
| Compressive strength (MPa) | 3.5 | 1.7 | 3.2 | 2.3 | 3.8 | 1.7 |

Examples 2 to 5

The procedure of Example 1 was repeated except that a formulation of a zeolite raw material was changed as shown in Table 2, to manufacture honeycomb structures. Additionally, in Examples 2 to 5, basic aluminum lactate was dissolved in a mass of water which was twice as much as a mass of basic aluminum lactate, and used.

Examples 6 and 7

The procedure of Example 1 was repeated except that a formation of a zeolite raw material was changed as shown in Table 2, to manufacture honeycomb structures. Additionally, in Examples 6 and 7, basic aluminum lactate was dissolved in a mass of water which was twice as much as a mass of basic aluminum lactate, and used.

Additionally, in Example 6, the formation and procedure of Example 3 were used except that as a coarse particle zeolite, chabazite which was 5.0 mass % ion-exchanged with copper ions and whose average particle diameter was 4.4 μm was used, to manufacture the honeycomb structure. In Example 7, the formation and procedure of Example 6 were used except that as a fine particle zeolite, chabazite which was 5.0 mass % ion-exchanged with copper ions and whose average particle diameter was 0.6 μm was used, to manufacture the honeycomb structure.

Comparative Examples 1 to 6

The procedure of Example 1 was repeated except that a formulation of a zeolite raw material was changed as shown in Table 3, to manufacture honeycomb structures. Additionally, in Comparative Examples 1 and 5, as an inorganic bonding material, an alumina sol was used. As the alumina sol, "AS520 (trade name)" of an alumina sol manufactured by Nissan Chemical Industries, Ltd. was used.

As to a zeolite material which is comprised a honeycomb structure body of the honeycomb structure of each of Examples 2 to 5 and Comparative Examples 1 to 6, values of the above-mentioned (1) to (9) were obtained. Table 4 or Table 5 shows the results.

Figure 8:
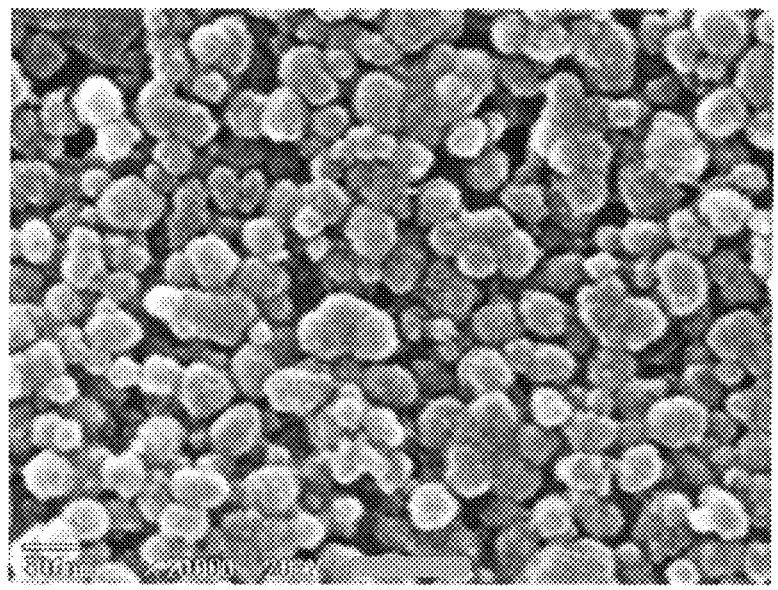
FIG. 8 is an SEM image of a zeolite material which is comprised a honeycomb structure body of a honeycomb structure manufactured in Example 1.
Figure 9:
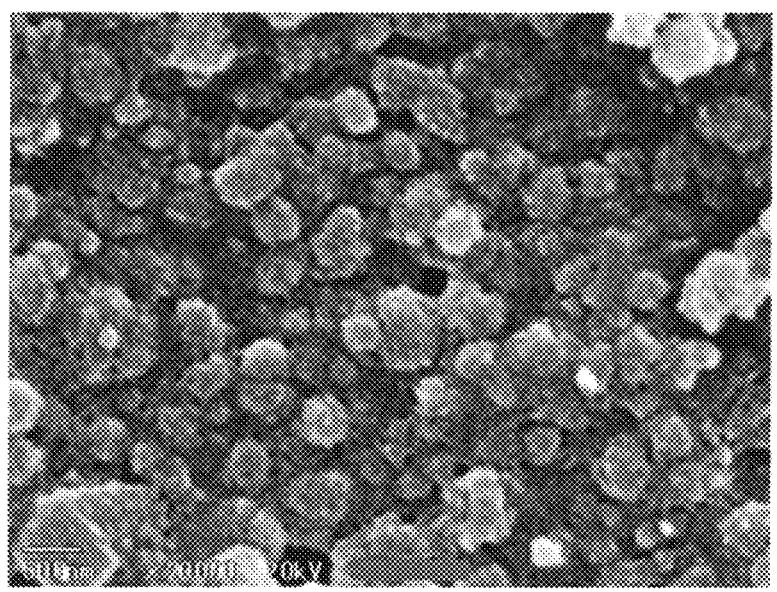
FIG. 9 is an SEM image of a zeolite material which is comprised a honeycomb structure body of a honeycomb structure manufactured in Comparative Example 1.

Furthermore, FIG. 8 and FIG. 9 show SEM images of the zeolite materials which are comprised the honeycomb structure bodies of the honeycomb structures of Example 1 and Comparative Example 1. FIG. 8 is the SEM image of the zeolite material which is comprised the honeycomb structure body of the honeycomb structure of Example 1. FIG. 9 is the SEM image of the zeolite material which is comprised the honeycomb structure body of the honeycomb structure of Comparative Example 1.

Result

As shown in Table 4, in the honeycomb structures obtained by Examples 1 to 7 in which basic aluminum lactate was used as a raw material of an inorganic bonding material, all compressive strengths were high. Furthermore, each of the honeycomb structures obtained by Examples 1 to 7 included a coarse particle zeolite which comprised a chabazite type zeolite in a zeolite material, and hence the honeycomb structure had an excellent $NO_x$ purification performance. In the honeycomb structures obtained by Examples 1 to 7, it is considered that agglomerating properties of the inorganic bonding material improve and the compressive strength improves. Especially, it is seen that a pore volume ratio of pores having pore diameters of 0.02 to 0.15 μm is 42 vol % or less, and hence the agglomerating properties of the inorganic bonding material improve. Furthermore, in the SEM image shown in FIG. 8, contours of zeolite particles in the zeolite material can comparatively clearly be confirmed. That is, in such a zeolite material, it is considered that the agglomerating properties of the inorganic bonding material in the zeolite material are high, a comparatively dense neck portion is formed by the inorganic bonding material, and the compressive strength improves.

On the other hand, in Comparative Examples 1 and 5 in which alumina sol and boehmite were used as a raw material of an inorganic bonding material, a compressive strength of each obtained honeycomb structure was low. An amount of alumina as the inorganic bonding material in a zeolite material was the same degree as compared with Examples 1 and 5, and hence it has been found that by using basic aluminum lactate as the raw material of the inorganic bonding material, the compressive strength of the obtained honeycomb structure improves. Furthermore, also in Comparative Examples 2 and 6 in which boehmite was used as a raw material of an inorganic bonding material, a compressive strength of each obtained honeycomb structure was low.

Also in Comparative Example 3 in which as a raw material of an inorganic bonding material, there was used an amount of basic aluminum lactate corresponding to 1 vol % as an amount of alumina of the inorganic bonding material in a zeolite material, a compressive strength of an obtained honeycomb structure was low. Similarly, in Comparative Example 4 in which as a raw material of an inorganic bonding material, there was used an amount of basic aluminum lactate corresponding to 1 vol % as an amount of alumina of the inorganic bonding material in a zeolite material, a compressive strength of an obtained honeycomb structure was also low. As to Comparative Examples 3 and 4, it is considered that the amount of basic aluminum lactate is small, agglomerating properties of the inorganic bonding material in the zeolite material are not sufficiently high, and the compressive strength does not improve. For example, in Comparative Examples 3 and 4, the amount of alumina in the inorganic bonding material of each obtained honeycomb structure is the same degree of amount as in Examples 3 and 5, but as compared with Examples 3 and 5, the compressive strength of the honeycomb structure was lower. Therefore, it has been found that by using a predetermined amount of basic aluminum lactate as the raw material of the inorganic bonding material, the compressive strength of the obtained honeycomb structure improves. For example, according to the SEM image shown in FIG. 9, in the zeolite material of the honeycomb structure obtained by Comparative Example 1, contours of zeolite particles in the zeolite material are comparatively unclear. This is thought the reason why the inorganic bonding material is broadly dispersed in the zeolite material.

A manufacturing method of a honeycomb structure of the present invention can be used as a method of manufacturing the honeycomb structure to purify $NO_x$ and the like contained in an exhaust gas emitted from a car engine, a construction machine engine, an industrial stationary engine, a combustion device or the like.

DESCRIPTION OF REFERENCE NUMERALS

1: partition wall, 2: cell, 3: circumferential wall, 4: honeycomb structure body, 11: first end face, 12: second end face, 31 and 131: coarse zeolite particle, 32 and 132: fine zeolite particle, 33 and 133: inorganic bonding material, 34: pore (first pore), 35: pore (second pore), 40 and 140: zeolite material, 100: honeycomb structure, and 134: pore.

What is claimed is:

1. A manufacturing method of a honeycomb structure, comprising:
    a step of mixing a coarse particle zeolite having a large average particle diameter, a fine particle zeolite having an average particle diameter smaller than that of the coarse particle zeolite, and a raw material of an inorganic bonding material to prepare a zeolite raw material;
    a step of forming the prepared zeolite raw material into a honeycomb shape to prepare a honeycomb formed body; and
    a step of firing the prepared honeycomb formed body to prepare the honeycomb structure,
    wherein in the step of preparing the zeolite raw material, as the coarse particle zeolite, a chabazite type zeolite is used in which an average particle diameter is 2 μm or more and 6 μm or less,
    the fine particle zeolite is used in which an average particle diameter is 0.02 μm or more and smaller than 2 μm,
    the raw material of the inorganic bonding material which includes at least basic aluminum lactate is used, and
    10 to 35 parts by mass of the basic aluminum lactate as the raw material of the inorganic bonding material is added to 100 parts by mass of a total mass of the coarse particle zeolite and the fine particle zeolite, to prepare the zeolite raw material.

2. The manufacturing method of the honeycomb structure according to claim 1,
    wherein in the raw material of the inorganic bonding material, a mass ratio of the basic aluminum lactate is from 65 to 100 mass %.

3. The manufacturing method of the honeycomb structure according to claim 1,
    wherein as the raw material of the inorganic bonding material, boehmite is further used in addition to the basic aluminum lactate.

4. The manufacturing method of the honeycomb structure according to claim 3,
    wherein in the raw material of the inorganic bonding material, a mass ratio of the basic aluminum lactate is from 65 to 90 mass % and a mass ratio of the boehmite is from 10 to 35 mass %.

5. The manufacturing method of the honeycomb structure according to claim 1,
    wherein 10 to 50 parts by mass of the raw material of the inorganic bonding material is added to 100 parts by mass of the total mass of the coarse particle zeolite and the fine particle zeolite, to prepare the zeolite raw material.

6. The manufacturing method of the honeycomb structure according to claim 1,
    wherein as the coarse particle zeolite, at least one selected from the group consisting of chabazite, SAPO-34 and SSZ-13 is used.

7. The manufacturing method of the honeycomb structure according to claim 1,
    wherein as the fine particle zeolite, at least one selected from the group consisting of a Φ-type zeolite, a Y-type zeolite, a ZSM-5 type zeolite and the chabazite type zeolite is used.

8. The manufacturing method of the honeycomb structure according to claim 1,
    wherein the basic aluminum lactate as the raw material of the inorganic bonding material is dissolved in water, and the basic aluminum lactate dissolved in water is mixed with the coarse particle zeolite and the fine particle zeolite, to prepare the zeolite raw material.

9. The manufacturing method of the honeycomb structure according to claim 8,
    wherein the basic aluminum lactate as the raw material of the inorganic bonding material is dissolved in an amount of water which corresponds to twice or more as much as the mass of the basic aluminum lactate.

10. The manufacturing method of the honeycomb structure according to claim 1, further comprising:
    a step of performing ion exchange of the coarse particle zeolite and the fine particle zeolite with copper ions.

11. The manufacturing method of the honeycomb structure according to claim 10,
    wherein the step of performing the ion exchange is performed prior to the step of preparing the zeolite raw material.

12. The manufacturing method of the honeycomb structure according to claim 1, wherein at least one inorganic fiber selected from the group consisting of alumina fiber, silica alumina fiber and glass fiber is further added to prepare the zeolite raw material.

13. The manufacturing method of the honeycomb structure according to claim 12,
wherein 5 to 20 parts by mass of the inorganic fiber is added to 100 parts by mass of the total mass of the coarse particle zeolite and the fine particle zeolite, to prepare the zeolite raw material.

\* \* \* \* \*